United States Patent

[11] 3,618,788

[72] Inventor James E. Murray
Cleveland, Ohio
[21] Appl. No. 1,406
[22] Filed Jan. 8, 1970
[45] Patented Nov. 9, 1971
[73] Assignee Harris-Intertype Corporation
Cleveland, Ohio

[54] PAPER CUTTER CONTROL
9 Claims, 5 Drawing Figs.
[52] U.S. Cl. .................................................. 214/1.6,
83/71, 318/603, 214/152
[51] Int. Cl. ............................................... B23q 5/22
[50] Field of Search .......................................... 214/1.4–1.6,
152; 83/71; 318/600, 603; 340/174.1
K

[56] References Cited
UNITED STATES PATENTS
3,176,556 4/1965 Roberts et al. ................ 83/71
3,192,808 7/1965 Fielder et al. ................. 83/71

Primary Examiner—Gerald M. Forlenza
Assistant Examiner—Frank E. Werner
Attorney—Marechal, Biebel, French & Bugg ABSTRACT: A position control circuit for slowing the movement of a high-inertia member prior to stopping at a preselected position includes a position control tape having magnetic pulse-generating marks stored thereon to define desired stopping positions of the member. A pair of pulse-sensing means scans the control tape with the first pulse-sensing means conditioning an electronic counter, the output of which controls the speed of the drive means. A second pulse-sensing means stops the member at the desired position. Position-indicating marks are also included on said control tape and are sensed by a third pulse-sensing means which supplies an input to the counter. After stopping, the drive means will restart at the higher speed unless other marks are detected by the first pulse-sensing means which have not yet been detected by the second pulse-sensing means, in which case the drive means will restart at the lower speed. In all cases, the control tape will move a distance at least equal to the distance between the first pulse sensing means and the second pulse sensing means before the counter returns to its predetermined status to insure that no additional stop marks are located between the sensing heads.

INVENTOR
JAMES E. MURRAY

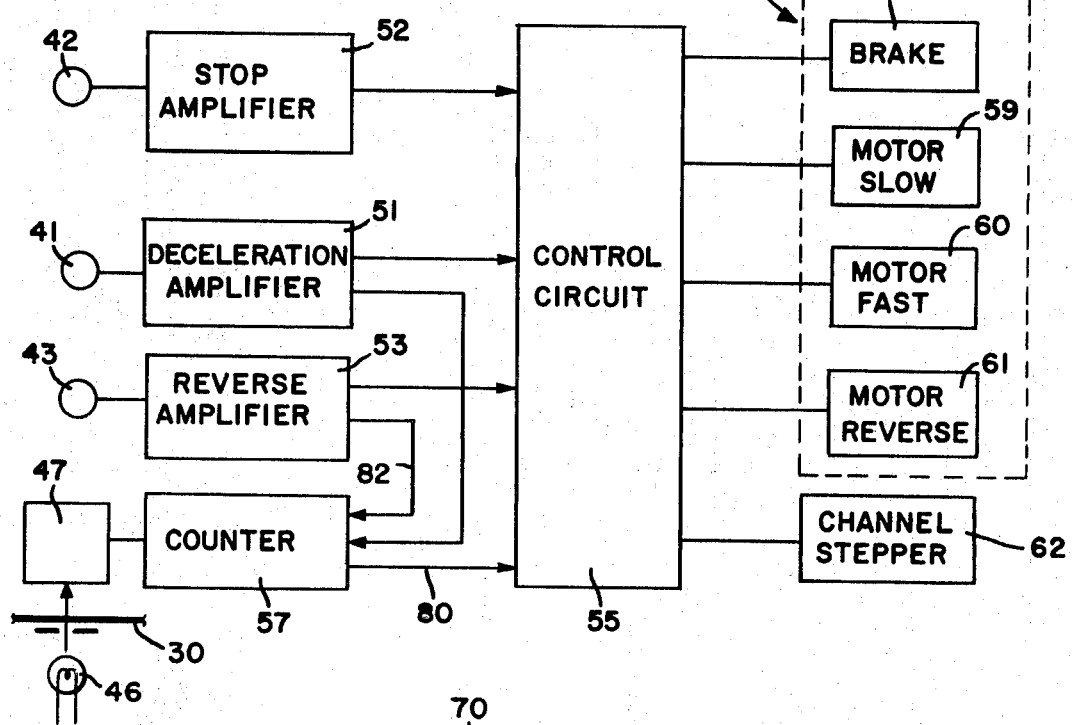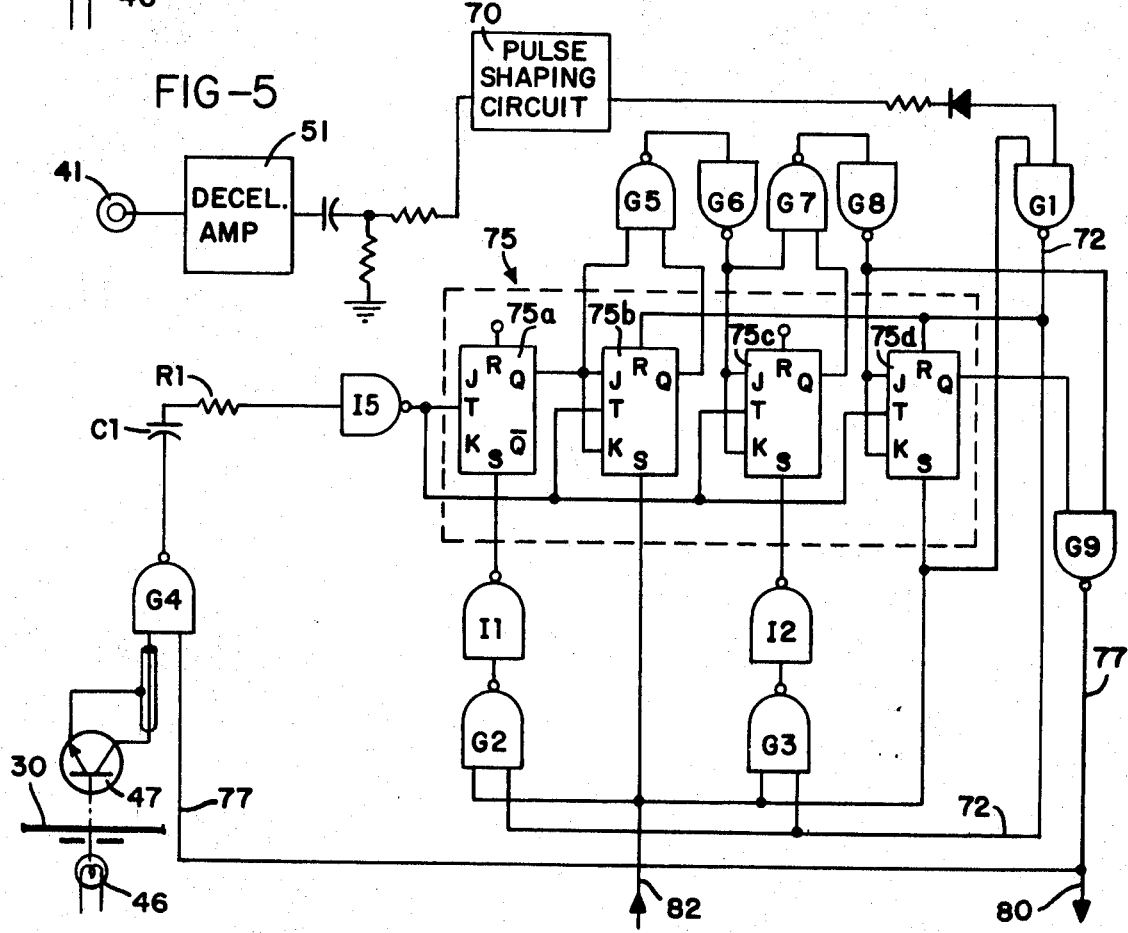

PAPER CUTTER CONTROL

RELATED APPLICATION

Reference is hereby made to copending application Ser. No. 1,407 filed Jan. 8, 1970 assigned to the same assignee as the present invention.

BACKGROUND OF THE INVENTION

In positioning a movable member having substantial inertia precisely in an infinitely variable number of positions, it has been the practice to slow the member prior to its reaching the final position, thereby permitting it to stop without substantial inertial effects. A control system including dual-speed drive means may be used with the drive moving the member over relatively long distances at the higher speed, and at relatively low speeds during the final portion of movement immediately prior to stopping at a preselected position.

A control or record member having the selected locations placed thereon for positioning the movable member, such as a back gauge used to position a pile of material beneath a knife of a cutting machine, is read by a pair of signal-sensing heads. The control member may be either an optical or magnetic device, such as a tape or drum. A first or deceleration head senses a mark on the control member to cause the drive to shift to a lower speed, and a second or stop head stops the drive at the preselected locations.

The minimum spacing between the deceleration and stop heads is chosen so that the back gauge and the materials will decelerate to the lower speed prior to the control mark reaching the stop head, and while there is no maximum spacing, it is desired to minimize the time at which the back gauge is moving at the lower speed in order to maximize the speed of operation of the cutter. A spacing of approximately seven-eighths inch between the deceleration and stop heads has been found to provide adequate time for deceleration to the lower speed while not unduly lengthening the time required to move the back gauge into position at the lower speed.

In material cutters, a trim mark is sometimes used, and this mark is frequently spaced closed to the first stop mark. If this trim mark is located between the two sensing heads, then means should be provided to cause relative movement between the heads and the control record prior to starting the mechanism in high speed, otherwise the member will be moving at the higher speed when the next stop mark is sensed, and inaccurate positioning of the member may result. U.S. Pat. No. 3,118,334 shows a paper cutter employing prescanning mechanisms where either the control record or the sensing heads are moved a distance at least equal to the distance between the sensing heads to determine the presence of such a trim mark.

SUMMARY OF THE INVENTION

This invention relates to a control circuit for use particularly with a high-inertia movable member which is positionable in an infinitely variable number of locations by a control or record member and which is driven by a dual speed drive means. A pair of signal-sensing heads responds to the marks on the control record, the first to slow the member, and the second to stop the member at the preselected location. The control member is moved relative to the sensing heads in direct proportion to the movement of the movable member. A measurement is made electronically of the relative movement of the control member and sensing heads. An electronic memory ensures that the movable member will start at the lower speed in the event that subsequent marks are sensed by the first sensing head but which have not yet traveled the distance to the second sensing head. In other words, the memory insures that the member will move at the lower speed through a distance sufficient to cause relative movement between the control record and the sensing heads equal to a distance at least that of the separation between the sensing heads after the first sensing head detects a control mark.

In the preferred embodiment, the memory is an electronic counter which is preconditioned each time a control mark is sensed by the first or deceleration head, and the output from the counter is used to place the drive means in its lower speed mode. Relative movement between the control record and the sensing heads by a distance at least equal to the distance between the deceleration and stop heads must occur without detection of additional control marks for the counter to obtain a predetermined value, at which time the drive will then be permitted to operate at the higher speed.

Thus, when a first control mark is sensed by the deceleration head, a distance measurement is initiated, and at the same time the drive is shifted to low speed. When the first mark travels to the second or stop head, the drive is stopped. In restarting, if the distance measurement is completed, indicating that no subsequent control marks are located between the sensing heads, then the drive will be shifted to high speed. On the other hand, if a second mark is detected by the deceleration head before the predetermined distance measurement is completed, then the distance measurement is reinitiated.

Thus, upon subsequent operation of the drive means to move the movable member to the next stop position, the drive means will operate at high speed upon completion of the measurement of the predetermined distance from the detection of the first control mark if the deceleration head has not detected another control mark. If a second control mark is detected during the predetermined distance measurement, the measurement is reinitiated and therefore the drive means will restart at the lower speed and will maintain that lower speed until a predetermined distance measurement from the second or subsequent detection of a control mark by the deceleration head has been completed.

Since the electronic means are used to determine the presence of closely spaced control marks, no mechanical prescanning of the control record prior to moving the movable member is required, thus eliminating a substantial number of mechanical components, the positioning accuracy of which relative to the control record must be maintained in order to insure the positioning accuracy of the movable member and the alignment of the sensing heads relative to the control member. Also, since no additional relative movement is required to prescan the record, wear of the record caused by contact with the head is reduced considerably. Accordingly, it is an object of this invention to provide an improved control circuit of the type described for use with a movable member, the circuit including an electronic counter to insure that the member moves at a lower speed until relative movement between the sensing heads and the control record by a distance at least equal to the separation between the sensing heads has occurred from the sensing of the last control mark by the first sensing head.

Other objects and advantages of the invention will be apparent from the following description, the accompanying drawings and the appended claims.

BRIEF DESCRIPTION OF THE DRAWINGS

FIG. 4 is an electrical block diagram of the control circuit for a paper cutter; and FIG. 5 is a detailed electrical schematic diagram of the memory circuit which controls the speed of the drive means.

DESCRIPTION OF THE PREFERRED EMBODIMENT

Figure 1:
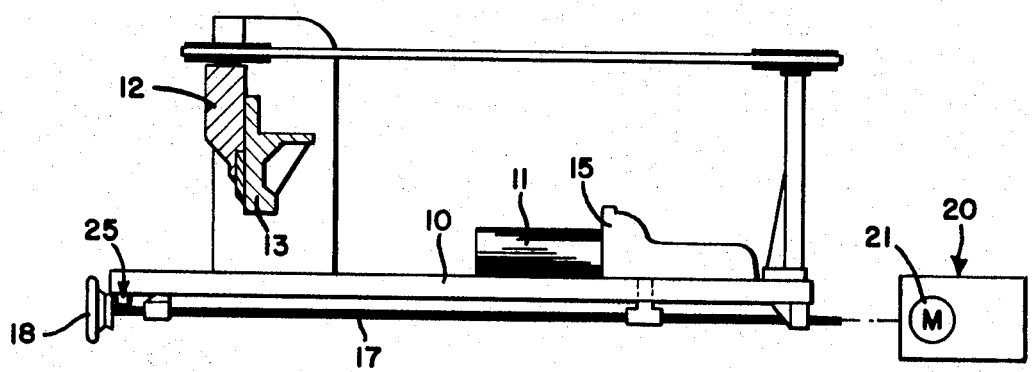
FIG. 1 is a side view of a paper cutter showing the relationship between a dual-speed drive means, a back gauge, a clamp, and a knife.

Referring to the drawings, a material-cutting apparatus is shown generally in FIG. 1 and includes a table 10 upon which a stack of material 11, such as paper, is placed to be cut by a knife 12. A clamp 13 holds the material during cutting while a back gauge 15 positions the material beneath the knife. The back gauge is moved by means of a lead screw 17 rotatably supported beneath the table. A hand wheel 18 is attached to one end of the lead screw and permits the machine operator to position the back gauge 15 manually. A dual-speed drive means 20, including an electric motor 21, supplies power to the lead screw 17 and positions the back gauge 15 automatically under the direction of a position control means 25. The position control means may take many forms, such as a magnetic tape or drum, as shown in U.S. Pat. Nos. 3,118,334 and 3,176,556.

To expedite the positioning of the material 11 beneath the knife 12, the back gauge 15 is initially moved at a higher rate of speed until a control signal or mark is sensed by a first sensing device at which time the drive means slows to a lower speed, and when a second sensing device detects the same control stop mark, the back gauge is stopped. Thus the high inertial effects of the back gauge and the material are substantially reduced by moving them over the final portion of travel at low speed.

In paper cutters especially, two controls marks may be located close together with the second control mark being used to trim the material. After the paper is cut, the back gauge normally begins movement at the higher speed, but if a trimming operation is to be performed, it is desirable that the back gauge be started at the lower speed to minimize the above-mentioned inertial effects. If the second control mark is located between the deceleration and stop sensing means, the present invention provides means to sense this mark and to cause the back gauge to restart at the lower speed.

One method of doing this is to scan the position control record prior to restarting the back gauge. This can be accomplished either by shifting the control record or by moving the sensing heads, as shown in U.S. Pat. No. 3,118,334. Whenever mechanical movement is performed, however, it causes additional wear of the record and requires additional equipment and accuracy in repositioning the sensing means or the control record. In the present invention, however, no mechanical prescanning devices are used.

Figure 2:
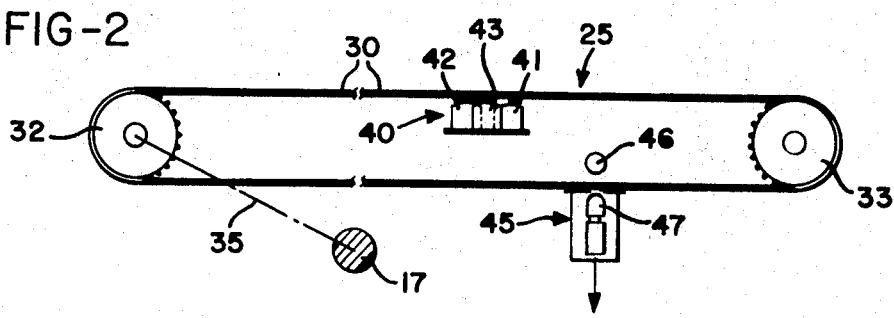
FIG. 2 is a front elevational view showing the position control means including a magnetic tape belt, sensing heads, and means for driving the magnetic tape from the paper cutter drive means.

Referring to FIG. 2, the control record is shown as a magnetic tape 30 which is formed into a continuous belt and reeved over sprocket wheels 32 and 33. Sprocket wheel 32 is driven by a chain 35 which in turn is driven by the lead screw 17. The tape 30, as shown in FIG. 3, includes sprocket holes 36 which mesh with the teeth on the sprocket wheels 32 and 33 to provide positive and accurate positioning of the tape at the same time the back gauge is positioned.

The magnetic tape belt 30 is divided longitudinally into two substantially equal parts by the sprocket holes 36. A sensing device 40, including three magnetic recording and/or playback heads 41, 42 and 43, senses the control marks recorded on the tape 30. Magnetic head 41 is the first sensing means and is designated as the deceleration head since its output is used to cause the drive means 20 to shift from the higher to the lower speed. Magnetic head 42 is the second pulse-sensing means and is designated the stop head since it causes the back gauge to stop upon sensing a control mark. Both heads 41 and 42 are aligned in the direction of relative movement of the tape and sense the same control marks. Sensing head 43 is a magnetic head which senses control marks on the other half of the tape 30, the occurrence of which reverses the travel of the back gauge.

The sensing device 40 is designed to move in a direction substantially perpendicular to the direction of relative movement to provide a plurality of different channels upon which position control marks can be recorded, thus giving versatility to the paper cutter by allowing several different jobs to be stored on the same control record. The apparatus for moving the heads relative to the tape is more completely described in copending application Ser. No. 1,407.

Figure 3:
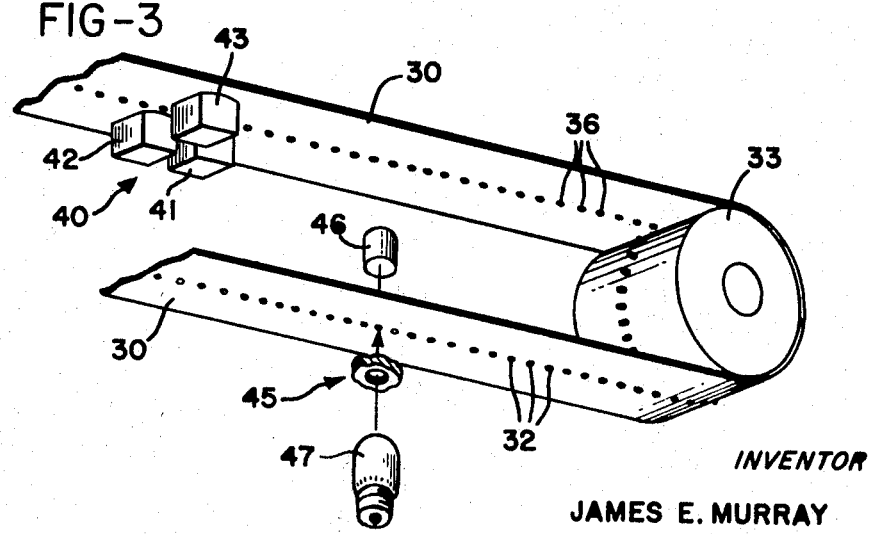
FIG. 3 is a perspective view showing the magnetic tape, the sensing head assembly, and a means for indicating movement of the tape.

Also shown in FIG. 3 is position-sensing means 45 which in this embodiment is an optical device including a lamp 46 on one side of the tape and a photoelectric transducer 47 on the other side of the tape. The lamp and transducer are aligned so that as the sprocket holes 36 pass over the photoelectric transducer, electrical pulses are created which are applied to an electronic counter, as will be explained; to permit the tape to move a distance equal to the distance between the sensing heads 41 and 42 while the back gauge drive means 20 operates at the lower speed, thus ensuring that no control mark is located between these two heads prior to moving the back gauge at the higher speed.

While the position-sensing means in the preferred embodiment of the invention includes a photoelectric device which senses the incremental movement of the control record by detecting the passage of sprocket holes in the tape, it will be understood by those skilled in the art that other types of movement sensing devices could be employed, including, but not limited to, magnetic pickups, microswitches, or capacity proximity pickups mounted to sense the movement of the drive means 20, the back gauge 15, the lead screw 17, the control record 30, etc. It has been found that there is an advantage in utilizing the sprocket holes for this purpose, however, since these holes perform the dual function of accurately positioning and moving the tape in response to the movement of the back gauge and indicating the movement of the tape relative to the sensing heads.

Referring now to the block diagram in FIG. 4, the deceleration head 41 is electrically connected to a deceleration amplifier 51, the stop head 42 is connected to a stop amplifier 52, and the reverse head 43 is connected to a reverse amplifier 53. The output from all of these amplifiers is applied to a control circuit 55. The photocell 47 is electrically connected to a counter circuit 57, and the output from this circuit is also applied to the control circuit 55.

The control circuit 55 controls a brake solenoid 58, a motor slow device 59, a motor fast device 60, a motor reverse device 61, and a channel stepping circuit 62. The motor fast device is normally energized to move the back gauge at the higher speed until a control mark is sensed by the deceleration head 41 at which time the control circuit 55 causes the motor slow device 59 to energize. Then, upon the sensing of the control mark by the stop head 42, the brake solenoid 58 is energized to stop the back gauge. Upon the sensing of a reverse pulse, the motor reverse device 61 causes the drive means 20 to reverse in direction and an output is applied to the channel stepper 62 to move the magnetic heads in the sensing device 40 to another channel.

Since no mechanical means is provided to sense the existence of a control mark physically located between the deceleration head 41 and the stop head 42, it is the purpose of this invention to ensure that the back gauge moves at the lower speed until the control tape moves the distance between these two sensing means after a control mark is sensed by the deceleration head 41. This function is accomplished by the counter circuit 57 which receives inputs from the deceleration amplifier 51, the reverse amplifier 53, and the position sensing means 45.

Referring now to the detailed electrical schematic diagram of FIG. 5, the deceleration head 41 is connected to the deceleration amplifier 51, the output of which is applied to a pulse-shaping circuit 70. Thus, upon sensing a mark on the control record by the deceleration head, a positive-going pulse of a fixed length, typically 100 milliseconds, is generated by the circuit 70 and applied to a gate G1. The output of gate G1 preconditions the electronic counter 75. The output of gate G1 is carried on line 72 directly to the reset inputs of gates 75b and 75d. The output on line 72 is also applied through gates G2 and G3 and inverters I1 and I2 to the set inputs of flip-flops 75a and 75c. The flip-flops within the counter 75 are conventional J-K flip-flops, the operation of which will be readily understood by those skilled in the art.

Thus, in the embodiment shown, the counter 75 is preset to a first condition and contains the numeral 1010, representing the number 5, and this preconditioning occurs each time a control mark is sensed by the first sensing means or deceleration head 41.

In the embodiment described herein, the spacing between the stop and deceleration heads is slightly less than 1 inch, typically seven-eighths of an inch, and the position-indicating means or sprocket holes 36 formed in the control record are one-tenth of an inch apart. Therefore, the sensing of 10 inch sprocket holes will indicate that the control record has moved 1 inch relative to the sensing heads, or a distance at least equal to the spacing between the stop and decelerating heads.

The passage of the sprocket holes 36 is sensed by the photoelectric transducer 47, shown in FIG. 5 as a phototransistor, and the output of this phototransistor is applied through gate G4 to a differentiating circuit, including capacitor C1 and resistor R1. The differentiating pulses are than applied through inverter I5 to the trigger inputs of each of the flip-flops 75a through 75d in the counter 75. Thus, for each pulse from the positon-sensing means, the counter 75 will be advanced by one unit.

Gates G5 and G9 are connected to the outputs of the flip-flops in the counter 75 to detect when a second condition is reached. As mentioned above, this occurs when 10 pulses from the phototransistor 47 have been added to the counter 75. This is represented by the numeral 1111 (corresponding to the number 15, in the counter. When this condition occurs, gate G9 will provide an output on line 77 to inhibit gate G4 to prevent any further pulses from the phototransistor from being applied to the counter 75. Thus, the counter 75 will remain in the second condition until another control mark is detected by the deceleration head 41.

The output of gate G9 is also applied on line 80 to the control circuit 55 to control the speed of the drive means for the back gauge 15. Therefore, as long as the counter is in the second condition (1111), the back gauge will be driven at the higher speed, and when the counter is in any other condition, the back gauge will run at the lower speed.

An inhibit signal is also applied on line 82 to gates G1, G2 and G3 during the time the back gauge is being driven in reverse to prevent unnecessary operation of the counter 75.

Any time a control mark is sensed by the deceleration head 41, even while the counter 75 is being pulsed by an output from the phototransistor 47, the counter 75 will be placed in the first condition (1010) by an output from gate G1 and line 72, thus causing the counter 75 to begin counting from that tape position until another 10 pulses, representing approximately 1 inch of tape travel, have been added to it. Since the status of the counter 75 will determine whether the back gauge will move at the higher or lower speed, if any control mark is located between the sensing heads, the drive means will be conditioned to operate only at the lower speed.

If a plurality of control marks are located close together on the control record, the counter will be conditioned each time a mark is sensed by the deceleration head 41, and therefore the last control mark detected by the deceleration head will determine the status of the counter. Therefore, the counter will cause the back gauge to move or restart at the lower speed until the last control mark between the sensing heads is detected by the stop head. For example, assume three control marks are spaced one-fourth inch apart on the tape. When the first control mark is detected by the deceleration head, the counter will be placed in the first condition causing the back gauge drive means to shift to the lower speed. After two counts have been applied to the counter by the third sensing means, the second control mark will be detected by the deceleration head and the counter will again be placed in the first condition. After three more counts, and before the first control mark has reached the stop head, the third control mark will be detected by the deceleration head, and the counter will again be placed in the first condition. The counter must thereafter by supplied with 10 pulses from the third sensing means, indicating a tape travel of approximately 1 inch, before it obtains its second condition (which will allow the drive means to move at the higher speed), thus assuring that the last of the control marks will be detected by the stop head while the drive means continues to operate at the lower speed.

While the counter in the embodiment described herein is preconditioned with the count representing the number 5 and stops counting when it contains a count representing the number 15, thus sensing the addition of 10 pulses, or 1 inch of tape travel, it will be understood by those skilled in the art that the counter may be preconditioned to any number and can be made to decrease in its count as well as increase, and that the coincidence gates G5 through G9 may be connected to respond to any predetermined number to indicate that sufficient relative movement has occurred between the control record and the sensing heads.

In the illustrated embodiment, the ratio of back gauge travel to tape movement was arbitrarily selected at 1:1. The ratio may be varied to meet specific design needs as long as a given back gauge movement produces a corresponding tape movement.

While the form of apparatus herein described constitutes a preferred embodiment of the invention, it is to be understood that the invention is not limited to this precise from of apparatus, and that changes may be made therein without departing from the scope of the invention as defined in the appended claims.

What is claimed is:

1. In a method for controlling the position of a movable member relative to a tool, which movable member is operable to be driven at stop, high-, and low-speed conditions,
   the steps of producing a first signal while said movable member is moving toward a first stop position at high speed, and first signal having a predetermined relation to the location of said movable member relative to said tool,
   shifting the drive for said movable member to low speed in response to production of said first signal and simultaneously initiating measurement of a predetermined distance proportionally equal to or slightly greater than a predetermined amount of travel traversed by said movable member while traveling at low speed toward the first stop position.,
   reproducing said first signal after the predetermined amount of travel of said movable member to locate said movable member at said first stop position,
   reinitiating distance measurement in the event a second signal is produced before said first signal is reproduced,
   and operating said movable member, upon subsequent movement toward a second stop position, to be driven at high speed in the event the predetermined distance measurement was completed without production of a reinitiating second signal before the first signal was reproduced, or, in the event a reinitiating second signal was produced in advance of reproduction of said first signal, then operating said movable member to be driven at low speed and maintained at said low speed until said movable members reaches and stops at the second stop position defined by the second signal.

2. In a control means for positioning a movable member relative to a tool comprising a plurality of signal-producing means on a record member defining desired stop positions of said movable member and signal-sensing means movable relative to said record member,
   drive means for said movable member controllable to operate at stop, high-, and low-speed conditions,
   means for relatively moving said record member and signal-sensing means in direct proportion to movement of said movable member,
   said signal-sensing sensing means comprising first and second sensors so spatially related in their direction of relative movement with respect to said record member that said first sensor responds to a first signal in advance of response thereto by said second sensor, means for measuring a predetermined distance of relative movement of said sensors and said record member, said predetermined distance being equal to or slightly greater than the spatial relation of said first and second sensors, said first sensor upon sensing said first signal while said drive means is operating at high-speed initiating operation of said measuring means and actuating said drive means to shift from high- to low-speed condition, said second sensor upon sensing said first signal controlling the stopping of said drive means and thereby positioning said movable member in a first stop position, said measuring means being responsive to said first sensor to reinitiate the predetermined distance measurement in the event a second signal is so spaced from said first signal as to cause said first sensor to respond to said second signal before said second sensor responds to said first signal, and said measuring means, upon subsequent operation of said drive means to move said movable member to a second stop position, being operative to shift said drive means to high speed upon completion of measurement of said predetermined distance from said first signal without the first sensor having responded to a reinitiating signal, or, in the event a reinitiating second signal was received by said measuring means, being operative to restart and maintain said drive means at low speed until said movable member stops at said second stop position defined by said second signal.

3. In an apparatus for controlling the speed of a movable member including position control means having control marks placed thereon to define successive desired stopping positions of said member;

multiple-speed drive means connected to move said member and selectively operable at relatively high and low speeds;

first sensing means for scanning said position control means to sense individual control marks thereon to control the shifting of said drive means from high to low speeds; and second sensing means for scanning said position control means for controlling the stopping of said drive means in response to said control marks;

the movement of said movable member causing relative movement between the said position control means and said sensing means;

the improvement comprising means for defining a plurality of substantially equally spaced position indicating means;

third sensing means for generating an output in response to said position-indicating means; and counter means for controlling the speed of said drive means;

said drive means operating at low speed when said counter means is in a first condition and operating at high speed when said counter means is in a second condition;

said counter means being placed in said first condition in response to an output from said first sensing means, said third sensing means supplying outputs to place said counter means in said second condition only after relative movement between said position control means and said sensing means has occurred by a distance at least equal to the distance between said first sensing means and said second sensing means.

4. The apparatus of claim 3 wherein said position-indicating means is on said position control means.

5. The apparatus of claim 3 wherein said position-indicating means is on said position control means and wherein said third sensing means produces output pulses in response to movement of said position control means.

6. The apparatus of claim 3 wherein said position control means is a magnetic tape and includes means defining a plurality of sprocket holes by which the tape is moved accurately in response to the movement of said movable member, and wherein said sprocket holes define said position-indicating means.

7. Apparatus for controlling the speed of a back gauge on a material-cutting device including multiple-speed drive means connected to move said back gauge, said drive means being selectively operable at relatively high and low speeds;

a tape for controlling the position of said back gauge, said tape being formed into a continuous belt;

means defining sprocket holes in said tape;

a sprocket Wheel for engaging said sprocket holes in said tape to move the tape accurately in response to the movement of said back gauge;

first sensing means for scanning said tape to detect individual control marks thereon to control the shifting of said drive means from high to low speed;

second sensing means for scanning said tape to stop said drive means upon detecting said control marks;

third sensing means for sensing the passage of said sprocket holes to produce output pulses indicating the movement of said magnetic tape relative to said third sensing means; and a counter, the output of which controls the speed of said drive means, said drive means operating the low speed when said counter is in a first condition and operating at high speed when said counter means is in a second condition;

said counter being placed in said first condition in response to an output from said first sensing means, said counter being placed in a second condition in response to a predetermined number of output pulses from said third sensing means after relative movement between said tape and said sensing means by a distance at least equal to the distance between said first sensing means and said second sensing means thereby to ensure that said drive means continues to move said back gauge at low speed until all control marks located between said first and said second sensing means have been detected by said second sensing means.

8. Apparatus of claim 7 wherein said tape is a magnetic tape having recorded thereon position control marks.

9. In an apparatus for controlling the speed of a movable member including position control means having control marks placed thereon to define successive desired stopping positions of said member, multiple-speed drive means connected to move said member and selectively operable at relatively high and low speeds, first sensing means for scanning said position control means to sense individual control marks thereon to control the shifting of said drive means from high to low speeds, and second sensing means for scanning said position control means for controlling the stopping of said drive means in response to said control marks, the movement of said movable member causing relative movement between said position control means and said sensing means, the improvement comprising means for measuring a predetermined distance of relative movement of said position control means and said sensing heads which is at least equal to the distance between said first and second sensing means, said distance measurement being initiated upon the sensing of each control mark by said first sensing means, and speed control means responsive to said distance measuring means and to said sensing heads for controlling the speed of said drive means, said drive means being operated at high speed until a control mark is detected by said first sensing means, and thereafter being operated at low speed until the control mark is detected by said second sensing means at which time said movable member is stopped, said speed control means, on subsequent operation of said drive means, causing said movable member to move at low speed until said predetermined distance measurement from the sensing of said last control mark by said first sensing means has been completed so that said movable member moves at low speed while control marks are located between said sensing heads.

* * * * *